United States Patent [19]

Frohne et al.

[11] 3,758,776

[45] Sept. 11, 1973

[54] APPARATUS FOR DETERMINING THE MELT INDEX OF PLASTICS

[75] Inventors: Johann-Christian Frohne, Dorsten; Ernst Hohmann, Gelsenkirchen-Buer; Werner Schneider, Gladbeck, all of Germany

[73] Assignee: Scholven-Chemie AG, Gelsenkirchen-Buer, Germany

[22] Filed: May 12, 1969

[21] Appl. No.: 823,659

[30] Foreign Application Priority Data
July 2, 1968 Germany ................... P 17 73 754.1

[52] U.S. Cl. ............................ 250/231 R, 73/56
[51] Int. Cl. ............................................. G01d 5/34
[58] Field of Search .................... 250/231, 232, 233, 250/215; 73/56; 356/27, 28, 32

[56] References Cited
UNITED STATES PATENTS 3,203,225  8/1965  Sieglaff et al. .................. 73/56 X
3,242,720  3/1966  Zavasnik ............................. 73/56
3,252,320  5/1966  Welty .................................. 73/56
3,408,500  10/1968  Carr ............................ 250/233 X

OTHER PUBLICATIONS

Gray, Jr. et al., Def. Pub. T869,014, published in 8690G714, on Dec. 16, 1969.

Primary Examiner—Walter Stolwein
Attorney—Burgess, Dinklage & Sprung

[57] ABSTRACT

In the determining of the melt index of plastics, a sample is forced from a cylinder through a calibrated orifice by means of a weighted plunger in a conventional manner. In this invention, the rate of movement of the plunger is converted to a series of electrical pulses which pulses are fed to a digital counter that determines the number of such pulses over a predetermined time interval. If the apparatus including the counter are suitably calibrated, the melt index of a sample can be displayed by the counter directly without the need to convert the reading.

2 Claims, 1 Drawing Figure

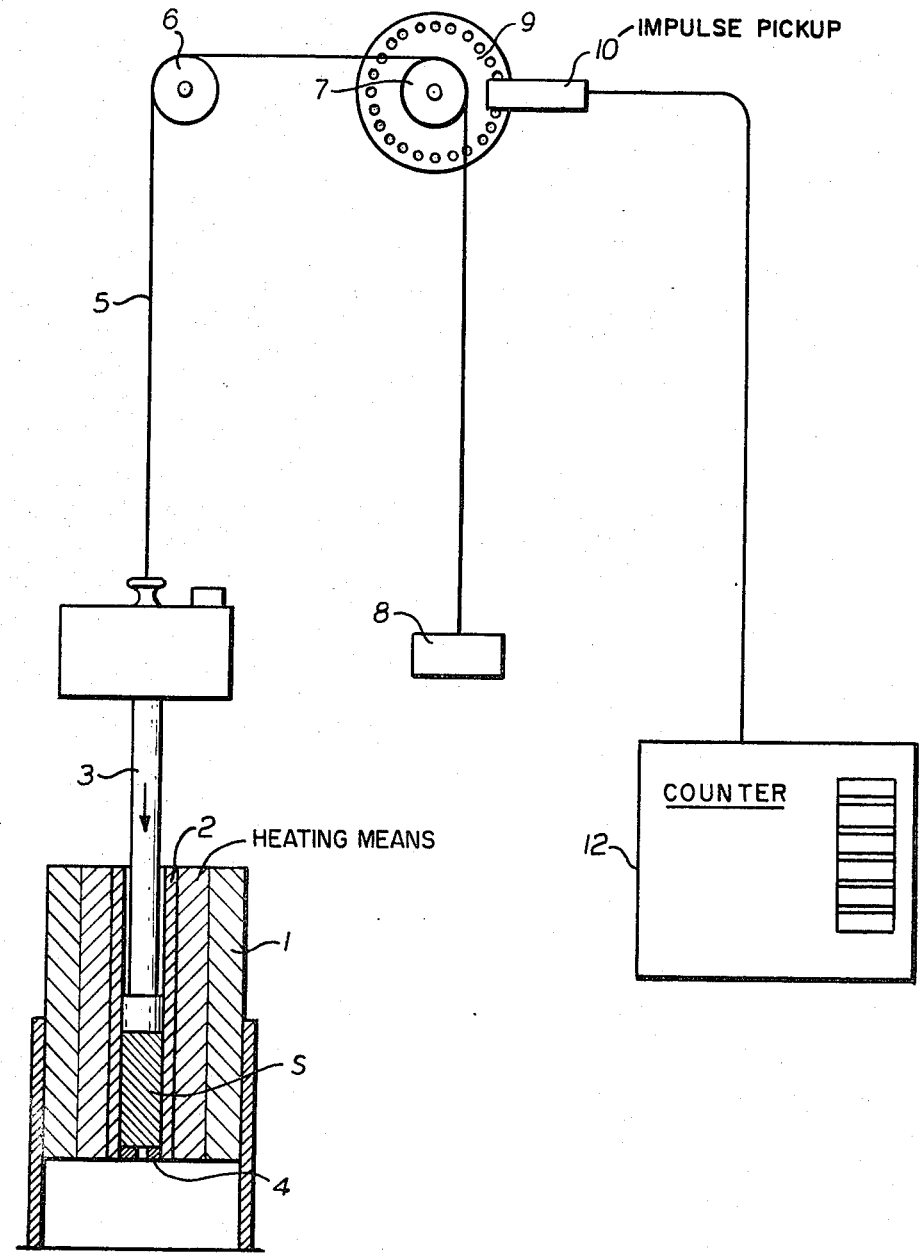

APPARATUS FOR DETERMINING THE MELT INDEX OF PLASTICS

PRIOR ART

In conventional apparatus for performing melt index measurements on plastics, a weighted plunger in a heated vertical cylindrical bore presses a specimen under predetermined conditions of temperature and pressure through a calibrated nozzle located at the bottom of the cylindrical bore.

To determine the melt index, a length of the fused strand emerging from the nozzle is cut off with a spatula or knife after a predetermined time and is weighed. The melt index, which is defined according to DIN Draft 53,734 as the quantity of fused plastic that flows out in ten minutes under standard conditions, can be determined by an easy calculation. This procedure entails in addition to the inevitable errors of principle involved in the measurement of viscosity on non-Newtonian fluids—and the determination of the melt index is such a measurement—many other possibilities of error, including for example errors as to the simultaneity of the cut-off and the time measurement. In computing the melt index, a quotient is formed from two observations involving the possibility of error.

It has been proposed to associate with the measuring apparatus a recorder on which the plunger movement is recorded as a function of time. In this case, the melt index is determined from the slope of a distance-time curve, the paper speed being known. However, this method of evaluation requires a graphic evaluation rather than weighing, and requires multiplication by a factor allowing for the paper speed, the geometry and the density of the specimen.

Also an electrical measurement of the time the plunger takes to pass between marks may be made. In this case, too, the rate of outflow is determined mathematically by forming the quotient of the constant distance and the measured time, including a calibration factor.

THIS INVENTION

In the present invention, the weighted plunger of the measuring apparatus is connected to a timing means which cooperates with a transducer to produce a series of electrical impulses which are then fed to a counting mechanism having a digital readout. The timing means in one embodiment is a perforated disk which is coupled with the plunger in such a manner that a linear movement of the plunger produces a proportional rotary movement of the perforated disk. A photoelectric cell is mounted adjacent the outer margin of the perforated disk for the purpose of producing and delivering to a counter an output of impulses proportional to the rotatory speed of the disk. In like manner, however, a disk can be used which is provided with spaced magnetized points along its margin, a magnetic transducer being provided adjacent the margin of said disk for the purpose of delivering to the counter an output of electrical impulses governed by the rotatory speed of the disk.

The plunger can be coupled with the timing wheel through the medium of a wire passing over a loose pulley and another pulley disposed coaxially with the timing wheel. The wire can be tensed by a weight which is attached to its free end and which is balanced with the plunger by means of a compensating weight.

In the melt index determination according to the invention, then, the plunger speed is measured directly as a representation of the rate of outflow. The numerical value of this speed can simply be read from counters or printed out on tapes. If the apparatus factor is first determined by initial calibration, a conversion of the readings to the desired index value is unnecessary. Where the impulse indication is suitably coupled with a timer and the apparatus factor has been determined, the desired reading of the melting index appears directly in its succession of digits on the counter and can be recorded and utilized digitally without conversion. The present apparatus permits the obtaining of a plurality of melt index values in rapid succession and the immediate recording of the values.

THE DRAWING

An example of one embodiment of the invention is schematically represented in the attached drawing.

DESCRIPTION AND EXAMPLE

With reference to the drawing, Housing 1 contains a heated passageway 2 and is provided with a weighted plunger 3. At the bottom end of the passageway 2 there is a calibrated nozzle 4, through which a specimen, S, is forced by the weighted plunger. A wire 5 is fastened to the top of plunger 3, passes over two pulleys 6 and 7 and supports at its free end a compensating weight 8. A timing wheel 9 is arranged coaxially in engagement with pulley 7. This can be either an optical, as shown, or a magnetic timing wheel. It is turned by wire 5 at a speed that is proportional to the speed of the plunger. Directly at the margin of timing wheel 9 there is arranged a photoelectric impulse pickup 10. With rotation of the timing wheel 9, this impulse pickup 10 delivers electrical impulses to counter 12 or a counting printer. A suitable counter that has been used is Model No. F043B, manufactured by Fa. Heugstler KG.

Depending on the rate of outflow of the specimen, S, a corresponding number of impulses can be counted in a preselected time interval. If the time interval is correctly set, namely to take into account a calibration factor governed by the geometry of the arrangement and the density of the fused material, the index value will be readable digitally in the counter 12.

With the invention, it is no longer necessary to measure distance and time separately and compute the rate of flow therefrom; instead, the rate of flow can be measured directly and automatically recorded. In this manner, errors in the cutting of the strands and in the measurement of time are eliminated.

What is claimed is:

1. Apparatus for directly measuring the melt index of a plastic comprising a cylindrical chamber adapted to be heated and to contain a charge of plastic, a calibrated orifice in one end of said chamber, a plunger mating with said chamber and adapted to expel said charge through said orifice with a predetermined force, means for converting the downward movement of said plunger into electrical impulses including means attaching said plunger to a rotatable disk adapted to cause said disk to rotate with a speed directly proportional to the linear speed of said plunger, said disk having spaced markings thereon, and impulse pick-up means adapted to observe said markings as the disk rotates, counting means having a digital readout adapted to receive said electrical impulses, said apparatus and said counting means being adapted to directly measure and display said melt index without measuring distance and time separately and computing the melt index therefrom.

2. The apparatus of claim 1 wherein said impulse pick-up means is a photoelectric cell and said markings are perforations about the periphery of said disk.

* * * * *